US011299657B2

(12) United States Patent
Gray et al.

(10) Patent No.: US 11,299,657 B2
(45) Date of Patent: *Apr. 12, 2022

(54) POLYOLEFIN-BASED HOT MELT ADHESIVES WITH IMPROVED PROPERTIES

(71) Applicant: Bostik, Inc., Wauwatosa, WI (US)

(72) Inventors: Steven Daniel Gray, Mequon, WI (US); Miao Hu, Pewaukee, WI (US)

(73) Assignee: BOSTIK, INC., Wauwatosa, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/688,155

(22) Filed: Apr. 16, 2015

(65) Prior Publication Data
US 2015/0299526 A1 Oct. 22, 2015

Related U.S. Application Data

(60) Provisional application No. 61/995,639, filed on Apr. 16, 2014.

(51) Int. Cl.
| *C09J 123/14* | (2006.01) |
| *C09J 123/06* | (2006.01) |
| *C09J 123/16* | (2006.01) |
| *C08K 5/053* | (2006.01) |
| *C08L 23/16* | (2006.01) |
| *C08K 5/00* | (2006.01) |
| *C08L 23/08* | (2006.01) |
| *C08K 5/01* | (2006.01) |
| *C08K 5/134* | (2006.01) |
| *C08K 5/52* | (2006.01) |

(52) U.S. Cl.
CPC ............ *C09J 123/14* (2013.01); *C08K 5/005* (2013.01); *C08K 5/0016* (2013.01); *C08K 5/0083* (2013.01); *C08K 5/01* (2013.01); *C08K 5/053* (2013.01); *C08K 5/134* (2013.01); *C08K 5/52* (2013.01); *C08L 23/0815* (2013.01); *C08L 23/16* (2013.01)

(58) Field of Classification Search
CPC ...... C08L 23/06; C08L 23/16; C08L 23/0815; C08L 2205/24; C08K 5/0083; C08K 5/0016; C08K 5/01; C08J 123/14
See application file for complete search history.

(56) References Cited

U.S. PATENT DOCUMENTS

| 4,076,670 | A | * | 2/1978 | Godfrey | ........................... 260/27 |
| 4,937,138 | A | * | 6/1990 | Mostert | ................... C09J 7/0203 |
| | | | | | 156/334 |
| 6,143,818 | A | * | 11/2000 | Wang | ........................ C08K 5/01 |
| | | | | | 524/474 |
| 6,300,398 | B1 | | 10/2001 | Jialanella et al. | |
| 8,921,464 | B2 | | 12/2014 | Liu et al. | |
| 2004/0081795 | A1 | * | 4/2004 | Wang | .................... C09J 123/142 |
| | | | | | 428/114 |
| 2005/0288412 | A1 | | 12/2005 | Hohner et al. | |
| 2006/0020067 | A1 | * | 1/2006 | Brant | ..................... C09J 123/10 |
| | | | | | 524/236 |
| 2010/0285325 | A1 | * | 11/2010 | Hoya | ...................... C08L 23/10 |
| | | | | | 428/516 |
| 2013/0060215 | A1 | * | 3/2013 | Knutson | .............. C09J 123/142 |
| | | | | | 604/366 |
| 2013/0203900 | A1 | | 8/2013 | Ellis et al. | |
| 2015/0024649 | A1 | | 1/2015 | Czaplewski et al. | |

FOREIGN PATENT DOCUMENTS

| JP | 2000297265 A | * | 10/2000 | |
| WO | 98/46694 | | 10/1998 | |
| WO | WO 2004/039907 A1 | | 5/2004 | |
| WO | WO 2012/014491 A1 | | 2/2012 | |
| WO | 2012/068576 | | 5/2012 | |
| WO | WO 2014/014491 | | 1/2014 | |
| WO | WO 2014014491 A1 | * | 1/2014 | ............ C09J 123/16 |

OTHER PUBLICATIONS

The machine translation; JP 2000-297265A; Oct. 2000; Matsuda et al.*
James Botkin et al.; "Improving molding productivity and enhancing mechanical properties of polypropylene with nucleating agents"; downloaded Feb. 4, 2019.*
International Search Report dated Aug. 28, 2015 issued in the corresponding PCT International Patent Application No. PCT/US2015/026113.
International Written Opinion dated Aug. 28, 2015 issued in the corresponding PCT International Patent Application No. PCT/US2015/026113.
Ninglai Zheng, "Current Situation and Trends in Nucleating Agents for Polypropylene", Jiangsu Chemical Industry, Oct. 2005, vol. 33, No. 5, pp. 1-10.
Eastman's Product Listing for Eastoflex Amorphous Polyolefins dated Oct. 5, 2018 (3 pages).
Eastman—Eastoflex E1003 Amorphous Polyolefin Product Description dated Oct. 5, 2018 (1 page).
Eastman—Eastoflex E1060 Amorphous Polyolefin Product Description dated Oct. 5, 2018 (1 page).

* cited by examiner

*Primary Examiner* — Karuna P Reddy
(74) *Attorney, Agent, or Firm* — Christopher R. Lewis

(57) ABSTRACT

A hot melt adhesive composition made from polypropylene copolymer or polypropylene impact copolymer, a polyolefin elastomer, a low density polyethylene, a tackifying resin, a plasticizer, and a nucleating agent. These adhesives are fast setting yet show an improved balance of mechanical properties making them useful for hygiene, construction, and packaging applications.

19 Claims, 2 Drawing Sheets

POLYOLEFIN-BASED HOT MELT ADHESIVES WITH IMPROVED PROPERTIES

BACKGROUND OF THE INVENTION

The present invention relates to hot melt adhesives, and more particularly to a hot melt adhesive made from polypropylene copolymer, a polyolefin elastomer, a low density polyethylene, and a nucleating agent. These adhesives are fast setting yet show an improved balance of mechanical properties making them useful for hygiene, construction, and packaging applications.

Hot melt adhesives are used to bond substrates under a broad range of application methods and process conditions for a large variety of end-uses. For example, hot melt adhesives are employed to bond non-woven materials, polymeric films, and elastomeric components in numerous fabricated articles. Laminated structures using hot melt adhesives to bond nonwoven materials and elastomeric components in the form of strands, films, or any other continuous or discrete forms are especially useful in hygiene products like diapers.

Hot melt adhesives are first melted in a melt tank and then coated in a molten state at the final location where the bond is required. Molten adhesives can be sprayed or coated as films and thin layers. Once cooled, the adhesive needs to fulfill multiple requirements such as bond strength measured by peel force or bond retention during or after mechanical stress, and during or after various thermal conditions.

Hot melt adhesives can be based on polymers such as polyolefins (ethylene- or propylene-based polymers), or functionalized polyolefins (ethylene or propene copolymers with oxygen containing monomers), or styrenic block copolymers containing at least one rubbery phase, like styrene-isoprene-styrene (SIS), or styrene-butadiene-styrene (SBS) polymers. Styrenic block copolymers are commonly employed due to their dual characteristics, i.e. cohesion of the styrenic phase associated with the rubbery behavior of another phase. Typical application temperatures are generally 120° C. to 180° C.

Over the years, many different olefinic polymers have been used in the formulation of hot melt adhesives. One of the first was amorphous polypropylene (APP) that could be combined with various tackifiers, plasticizers, waxes and fillers to produce a hot melt adhesive for a variety of end-use applications.

Later, olefin polymers became available that had much improved properties over the original APP polymers. These are referred to as amorphous poly alpha olefins (APAO). They are generally produced using Ziegler-Natta catalysis and can be made using a variety of monomers, including but not limited to propylene, ethylene and butene. Various copolymers and terpolymers are produced by a number of manufacturers. They include Evonik Industries, who produce the Vestoplast® polymers; REXtac, LLC, who produces the Rextac® range of materials, and Eastman Chemical, manufacturers of the Eastoflex® line of polymers. They are all characterized by having a very low degree of crystallinity, which is estimated by measuring the heat of fusion of the polymer material with Differential Scanning calorimetry (DSC). As commercially produced, they are random polymers having broad molecular weight distributions.

More recently, metallocene and single-site catalysis have been developed to produce polyolefins with more precisely tailored properties. For example, the molecular weight distribution can be controlled to provide polymers with significantly narrower polydispersity values compared to those produced employing traditional Ziegler-Natta catalysts. Metallocene and single-site catalysts also show, in general, high comonomer incorporation compared to Ziegler-Natta catalysts. This allows high levels of comonomers, such as 1-butene and 1-octene, to be incorporated into the polymer to reduce the crystallinity and provide low density polymers. Examples of these polymers include Affinity® and Engage® polymers from the Dow Chemical Company.

SUMMARY OF THE INVENTION

The present invention is an adhesive based on mixtures of a polypropylene copolymer, a polyolefin elastomer, a low density polyethylene, and a nucleating agent. These adhesives display fast set rates yet show an improved balance of mechanical properties making them useful for hygiene, construction, and packaging applications.

Hot melt adhesives that employ APP, APAO, and low density metallocene and/or single-site polyolefin elastomers are well known in the art. Due to their low crystallinity, adhesives made from these polyolefin systems generally show good compatibility and long-term thermal aging performance with plasticizing and tackifying agents commonly used in hot melt formulations. Due to their low crystallinity, however, these polyolefin species tend to develop properties only slowly after application, leading to long open times that can make them unsuitable for construction applications where the adhesive properties must develop rapidly to form strong bonds. In generating laminate structures using porous substrates such as nonwovens, slow set up characterized by the slow development of modulus upon cooling can lead to over-penetration of the adhesive leading to blocking, equipment fouling, and even compromised mechanical performance of the final article. Additionally, adhesives generated solely from polyolefins with limited crystallinity can also display poor long-term performance when used in applications where the adhesive must be able to resist shear forces. Adhesives based solely on polyolefin elastomers offer little resistance to such failure modes.

Hot melt adhesives based on higher crystallinity polyolefins can offer a different set of potential drawbacks. Polypropylene polymers containing low levels of comonomer can be employed to provide hot melt adhesive formulations that develop rapidly upon cooling in coating applications. These more crystalline materials, however, tend to exhibit poor compatibility in hot melt adhesive formulations. Additionally, hot melt adhesives generated from higher crystallinity polyolefins tend to possess lower tack due to the higher modulus of these systems when the polypropylene polymer is added at levels required to provide suitable cohesive strength to provide strong bonds.

Combinations of polyolefin elastomers with higher modulus polypropylene polymers and copolymers have been reported that help to overcome some of the issues described formulating from the independent components. Given their semicrystalline nature, even mixed polyolefins systems can show lower than required set up times for end-use applications. For this reason, higher crystallinity materials such as waxes are often added to polyolefin-based hot melt adhesives to assist the rapid development of properties after application. The use of wax and functionalized waxes in conjunction with polyolefin nucleating agents has also recently been described. Despite the benefits offered, systems employing low molecular weight, crystalline waxes have significant limitations. They may increase the setting speed but can also reduce the wet-out and adhesion of the hot melt. Additionally, the use of low molecular weight, crystalline waxes at even relatively low levels can compromise the mechanical properties such as elongation required for hot melt adhesives employed in elastomeric constructions. Therefore, there exists a need in the art for hot melt adhesive formulations that display rapid set, a good balance of mechanical properties, and excellent long-term aging performance.

Quite surprisingly, we have found that the inclusion of polyolefin nucleation agents in combination with low density polyethylenes in polyolefin-based formulations provide hot melt adhesives that develop properties rapidly upon cooling yet display excellent compatibility, thermal aging, and improved mechanical performance.

The adhesives described offer improved performance characteristics compared to previously formulated adhesives. In particular, the combination of a polypropylene-based polymer, a polyolefin elastomer, a low density polyethylene, and a nucleation agent have been found to provide hot melt adhesives that display a unique combination of fast set-up, strong adhesion, low viscosity, and excellent mechanical properties. Compared to conventional SIS based or SBS based adhesives, the polyolefin-based adhesives described offer improved performance stability when aged at elevated temperatures.

Polypropylene copolymers suitable for this invention include poly(propylene-co-ethylene) copolymers with relatively high crystallinity that display melting points in the range of 100 to 165° C. Polypropylene impact copolymers can also be employed. Polypropylene impact copolymers are thermoplastic resins, unique in that they are produced through the polymerization of propylene by introducing a heterophasic structure inside a semi-crystalline polypropylene (PP) homopolymer matrix. The copolymer consists of two principal phases, a semi-crystalline polypropylene homopolymer matrix, and a rubbery ethylene-propylene copolymer phase containing a small amount of polyethylene homopolymer and or a mixture of semi-crystalline ethylene-propylene copolymers. The crystalline matrix phase provides the strength and stiffness, while the presence of the rubbery phase imparts good impact resistance, and flexibility to the adhesive composition. Polypropylene impact copolymer materials have long been commercially important materials with unique properties most appreciated by the automotive industry for use in dashboards, bumpers or other automotive parts, as well as other innumerous commercially injection molded items, cast and extruded film composites, thin-walled packaging containers and other household articles and products. Until now polypropylene impact copolymers have not shown utility in the adhesive marketplace, and as a consequence, were never formulated specifically into adhesive products or more specifically, into products intended for the adhesive bonding of films, nonwoven materials or elastomeric substrates.

Unlike APP materials, higher density polypropylene polymers and copolymers described above generally lack adhesion, open time and processability needed for adhesive hot melt applications. With careful formulation, however, these materials can be designed to achieve the desired adhesive properties. Examples of types of polypropylene grades acceptable for this invention are Pro-fax® random copolymers offered by LyondellBasell as well as those offered by Braskem. Examples of polypropylene impact copolymers include the various polymer grade slates such as Hostalen®, Moplen®, and Pro-fax®, as well as several other brands available from LyondellBasell and Total Petrochemcials. Polypropylene impact copolymers are also routinely produced by any of a host of companies that participate in today's injection molding polypropylene polymer marketplace.

Various methods are conventionally used to coat a hot melt adhesive at fairly low viscosity onto a substrate. This can be accomplished by roll coating or any printing type method, or by slot coating, by extrusion or by spray gun. Spray gun techniques are numerous and can be done with or without assistance of compressed air that would shape the adhesive spray, and consequently the adhesive pattern. The hot melt adhesive material is generally allowed to melt in tanks, and is then pumped through hoses to the final coating spot on the substrates. Any application temperature above the softening point of the adhesive formulation is suitable, although for the preferred invention, the temperature at which the hot melt adhesive is applied should be equal to or below 190° C., preferably equal to or below 180° C., and most preferably equal to or below 170° C., so that heat sensitive substrates would not be damaged.

The Brookfield viscosity (as measured via ASTM D3236-88) of the adhesive material should be generally equal to or lower than 80,000 cP, preferably equal to or lower than 40,000 cP and most preferably lower than 20,000 cP measured at 163° C. (325° F.). An adhesive with such low viscosity is needed to operate in standard hot melt adhesive equipment and to achieve the right pattern and consequently the right bonding performance at the application temperature.

The adhesive of the present invention can be used with any application where various substrate materials are involved like non-woven materials, polymeric films, and in general elastomeric components put in items like diapers, in the form of strands, films, nonwovens or any other continuous or discrete form. Any substrate material and any substrate form could be used in any combination possible with the adhesive serving to bond two or more substrates together. The substrates can be of multiple forms for example fiber, film, thread, strip, ribbon, coating, foil, sheet, and band. The substrate can be of any known composition for example polyolefin, polyacrylic, polyester, polyvinyl chloride, polystyrene, cellulosic like wood, cardboard and paper, or made out of mineral compounds like concrete, glass or ceramics. The substrate's mechanical behavior can be rigid, plastic or elastomeric. Among elastomeric material are various examples like natural or synthetic rubber, polyurethane based copolymers, polyether or polyester urethanes, block copolymers of styrene or of amides, or olefinic copolymers. The above lists are not limitative or all-inclusive, but are only provided as common examples. In the present invention, various methods to process hot melt adhesives can be employed based on their ability to be melted, and transported and/or coated or sprayed in a molten stage to the final location where the bond is required.

The adhesive of the present invention can also be used with any application where composites and disposable products are made. Once the bond is made, the adhesive must develop adequate cohesion to withstand mechanical stress at low, ambient or elevated temperature, in particular under shear conditions. Diaper, adult incontinence products, sanitary napkins and other absorbent disposable products are typical applications for the adhesive composition of the invention, as well as bed pads, absorbing pads, surgical drapes and other related medical or surgical devices. Construction applications, structural applications or packaging applications for food or general packaging, labeling of packages, cans, or bottles, various product assembly, as well as transportation related bonding applications are also examples where the invention is useful. The adhesives are also useful in the construction of poly and poly woven bags or articles.

PREFERRED EMBODIMENT

Figure 1:
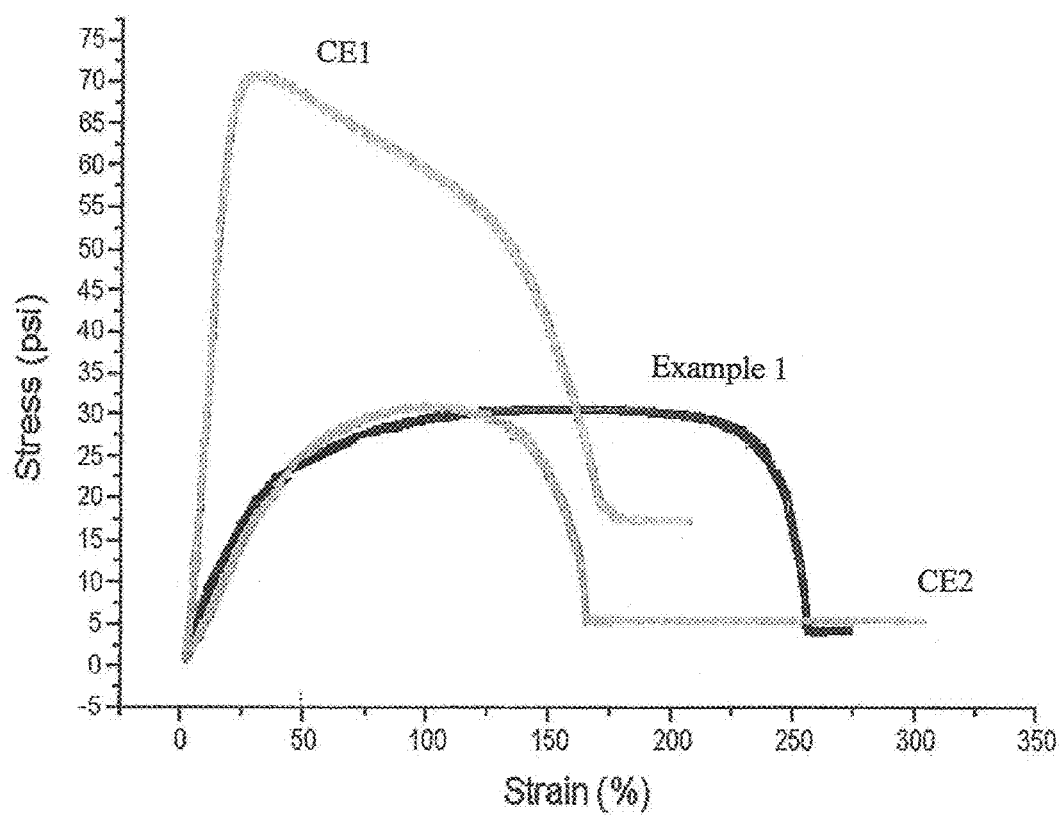
FIG. 1 is a graph of stress-strain curves for the compositions of inventive Example 1 and Comparative Examples 1 (CE1) and 2 (CE2) described hereinafter.

Accordingly, the present invention provides a hot melt adhesive composition, comprising a blend of the following components:

About 1% to about 30%, preferably about 2% to about 20%, and most preferably about 2.5% to about 15% by weight, of a polypropylene copolymer or polypropylene impact copolymer or mixture of polypropylene species such as a mixture of polypropylene copolymers, a mixture of polypropylene impact copolymers, or a mixture of one or more polypropylene copolymer with one or more polypropylene impact copolymer;

About 1% to about 30%, preferably about 2.5% to about 20%, and most preferably about 5.0% to about 15%, by weight of an olefin based elastomer or mixture of olefin based elastomers;

About 1 to 30%, preferably about 2% to about 20%, and most preferably about 2.5% to about 20% by weight, of a low density polyethylene or mixture of low density polyethylenes.

About 0.05 to about 5.0%, preferably about 0.1 to about 2.5%, more preferably about 0.2 to about 1.0% by weight of a polyolefin nucleating agent;

About 5% to about 70%, preferably about 10% to about 60%, and most preferably about 25% to about 55% by weight, of tackifying resin having a softening point of at least about 80° C. and up to about 140° C. and more preferably a softening point of from about 85° C. to about 135° C.;

About 1% to about 60%, preferably about 5% to about 55% and more preferably about 10% to about 50%, by weight, of a plasticizer;

About 0.1% to about 5% of a stabilizer or antioxidant; and

Wherein the components total 100% by weight of the composition, and the viscosity (measured by ASTM D3236-88) of the composition is equal to or less than about 80,000 cP at 163° C. (325° F.), preferably equal to or less than 40,000 cP at 163° C., and most preferably equal to or less than 20,000 mPas at 163° C.

In addition to the polymer components in the present adhesive composition about 1% to about 15% by weight of an additional auxiliary polymer comprising poly(ethylene-vinyl acetate) (EVA), an amorphous poly alpha olefin (APAO), a polyethylene (PE), a polypropylene (PP), a polybutene (PB), or a styrenic block copolymer such as poly(styrene-b-isoprene-b-styrene) (SIS), poly(styrene-b-isoprene) (SI), poly(styrene-b-butadiene-b-styrene) (SBS), poly(styrene-b-butadiene) (SB), poly(styrene-b-isoprene-b-butadiene-b-styrene) (SIBS), poly(styrene-b-ethylene-b-butylene) (SEB), poly(styrene-b-ethylene/butylene-b-styrene) (SEBS), poly(styrene-b-ethylene/propylene) (SEP), poly(styrene-b-ethylene/propylene-b-styrene) (SEPS), poly(styrene-b-butadiene-b-butylene-b-styrene) (SBBS), poly (styrene-b-ethylene-b-ethylene/propylene-b-styrene) (SEEPS), and blends of one or more of each thereof, may also be used. The auxiliary polymer is a polymer that is different from the polypropylene copolymers and impact copolymers, the olefin based elastomer, the low density polyethylene, and the tackifying resins, and functions to provide a desired physical property, depending on the end use of the adhesive composition.

Relatively low amounts, 0.1 to about 5% by weight, of paraffin waxes, microcrystalline waxes, and/or polyethylene or polypropylene waxes and the like may also be used to adjust surface tack so long as the wax does not interfere with the level of performance required by the end use.

The adhesive composition and/or laminate of the present invention may be used in making a variety of end products. Examples include a disposable diaper, a sanitary napkin, a bed pad, a bandage, a surgical drape, a tape, a label, a plastic sheet, a nonwoven sheet, a paper sheet, a cardboard, a book, a filter, or a package.

In yet another aspect, the present invention provides a method of making a laminate comprising the steps of feeding a first substrate in a first direction; feeding a second substrate spaced from said first substrate in said first direction; applying the adhesive composition to one or both of said substrates; and compressing said substrates together to form the laminate.

When an elastomeric laminate is desired, the method includes the additional steps of feeding one or a plurality of elastomeric substrate or substrates between said first and second substrates in said first direction, said elastomeric substrates are stretched before, during or after adhesive application; and applying the adhesive composition to either said elastomeric substrate or substrates or one or both of said substrates before compressing the substrates together. The elastomeric substrate is preferably at least one elastic strand stretched up to 500% from its initial relaxed state.

DETAILED DESCRIPTION OF THE INVENTION

The invention consists of formulations containing at least one of each of the following components: (1) a polypropylene copolymer or impact copolymer; (2) a polyolefin elastomer; (3) a low density polyethylene species; (4) a nucleating agent; (5) a plasticizer; (6) a tackifying agent; and optionally, (7) additives, waxes, surfactants, fillers, and/or other auxiliary components as required to adjust properties for end-use performance.

The polypropylene materials used in the adhesive composition can be a polypropylene random or impact copolymer. For the polypropylene random copolymers, the comonomer can be ethylene or a 1-alkene such as 1-butene, or 1-hexene and should be present in relatively low levels (10 wt % or less). For heat resistance, thermal aging performance, and/or bond retention during and after mechanical and/or thermal stress, suitable materials for this component generally possess a higher crystallinity than the polyolefin elastomers employed in this invention. Suitable polypropylene copolymers and impact copolymers for this invention generally display melt points as measured by DSC in the range of 100 to 165° C.

In some embodiments, the polypropylene copolymers and polypropylene impact copolymers have melt flow rates at 230° C., of at least 0.5 g/10 min to about 1000 g/10 min. Preferred polypropylene copolymers and impact copolymers have melt flow rates of between 10 and 250 g/10 min using ASTM D-1238 with a temperature of 230° C. and a 2.16 kg weight. More preferred are melt flow rates of between 20 and 200 g/10 minutes. Most preferred melt flow rates are between 30 and 150 g/10 minutes. Examples of polypropylene random copolymers suitable for this invention are Pro-fax® RP591V and Pro-fax® RP488S available from LyondellBasell as well as RP250 and RP350 available from Braskem. Suitable impact copolymers useful in this invention are Pro-fax® EP501V and Pro-fax® EP390S available from LyondellBasell as well as 5946WZ and 4944WZ available from TOTAL Petrochemicals.

The polypropylene copolymer or impact copolymer is generally present in the adhesive compositions in amounts of about 1 to 30% by weight of the composition, preferably about 2 to 20% by weight are utilized, and most preferably about 2.5 to 15% by weight. Blends of two or more polypropylene copolymers and/or impact copolymers may also be used. For example, a blend of a first polypropylene copolymer and a second polypropylene impact copolymer that is different than the first polypropylene copolymer may also be employed. From about 0% to about 30% by weight of one or more additional polypropylene copolymers or impact copolymer may be blended together with the first polypropylene impact copolymer if desired.

Olefin elastomers suitable for the present invention include random poly-α-olefin copolymers and terpolymers derived from ethylene, propylene, butene, 1,4-methylpentene, hexene, octene and combinations thereof. Polyolefins include ethylene polymers, propylene polymers, and combinations thereof including combinations with other $C_4$-$C_{10}$ alpha-olefins. Elastomeric polyolefins typically contain ethylene and propylene, and may contain other $C_4$-$C_{10}$ olefin monomer units. Vinyl acetate copolymers of olefins of are also suitable. Some particularly preferred polyolefin polymers are copolymers of propylene with at least one other olefin monomer, such as ethylene-propylene copolymers and ethylene-octene copolymers. The most preferred polymers are propylene/ethylene elastomers, which can be obtained from ExxonMobil Chemical under the trade name designation Vistamaxx®. Suitable commercial grades range from about 9% to about 16% by weight ethylene, a melt Index of from about 1 to about 10 g/10 min, and a density of from about 0.86 to 0.88 grams/cubic centimeter. One particularly preferred grade is Vistamaxx® 6202, which is a poly (propylene-co-ethylene) elastomer with about 85% propylene and 15% ethylene and has a Melt Index (190° C./2.16 kg) of 9.1 g/10 minutes and a density of 0.863 g/cc. Olefin block copolymers such as the Infuse® materials sold by Dow that are composed of ethylene and 1-octene are also well suited for this invention. Polypropylene homopolymers with low isotacticity indices and melting points, such as the L-MODU® 5400, 5600, and 5900 grades available from Idemitsu are also suitable elastomeric polyolefins. The process to make these polymers is described in detail in U.S. Pat. No. 6,797,774 (assigned to Idemisui Petrochemical Co., Ltd. of Tokyo, JP) along with various hot melt adhesive formulations.

Ethylene propylene rubbers (EPR) may also be employed as elastomeric components. The term EPR, as used herein, refers to elastomeric copolymers of ethylene and propylene, or such said copolymers modified with functional monomers. The functional monomers include a class of unsaturated organic compounds containing one or more functional groups including carboxylic acid group (—COOH), anhydride group (—CO—O—CO—), hydroxyl group (—OH), ether group (—OR, R is a hydrocarbon radical), primary, secondary and tertiary amine groups and ester group. The content of propylene in the copolymer is in the range of 15% to 70% by weight, preferably between 20% to 45% by weight. The term EPDM refers to elastomeric terpolymers comprising of 15% to 70% by weight, preferably between 20% and 45% by weight, of propylene, from 20% to 80% by weight of ethylene and from 2% to 15% by weight of a diene, for example, 1,4-hexadiene, norbornadiene, ethylidene-norbornene, dicyclopentadiene, butadiene and isoprene. The EPDM used here also includes functionally modified versions of terpolymers containing the functional groups herein mentioned above. EPR and EPDM rubbers are commercially available from Exxon Chemical Company under the Vistalon trade name and from DMS Polymers, Inc. under the Kelton trade name. Functionally modified EPDM containing anhydride groups are sold under the trade name Exxelor by Exxon Chemical Company. As can be seen from what is disclosed above, the preferred EPR or EPDM rubber content is between 5% to 65% by weight. Below 5% there is insufficient cohesiveness while above 65% the viscosity of the composition becomes too high. The composition most preferably contains 15% to 40% by weight of EPR, or EPDM, or a mixture thereof.

The olefin elastomer is generally present in the adhesive compositions in amounts of about 1 to 30% by weight of the composition, preferably about 2.5 to 20% by weight are utilized, and most preferably about 5 to 15% by weight. Blends of two or more olefin elastomers may also be used. For example, a blend of a first olefin elastomer and a second olefin elastomer that is different than the first olefin elastomer may also be employed. From about 0% to about 30% by weight of one or more additional olefin elastomer may be blended together with the first olefin elastomer if desired.

To exhibit the surprising balance of properties of this invention, a low density polyethylene species or mixture of low density polyethylene species must also be present. These species are poly(ethylene-co-alpha-olefin) where the 1-olefin comonomer can be selected from 1-butene, 1-hexene, 1-octene, and the like. To ensure properties are not compromised, these polyethylene species should have a suitable molecular weight as gauged by melt index values from 10 to 1000 g/10 min (190° C./2.16 kg). To ensure good compatibility with the other hot melt components, the density of the low density polyethylene species present should be less than 0.94 g/cc, as determined via the method described in ASTM D792-00. Although any polymer falling in the range of properties herein described above can be used, preferred polyolefin polymers useful in this invention are available from Dow Chemical Co. under the trade name designations Affinity® and Engage®. Other suitable grades include Petrothene GA GA584189 from LyondellBasell as well as Dow DNDB 1077 linear low density polyethylene materials. Functionalized polyolefins, such as GA1000R from Dow chemical can also be used.

Polyolefin nucleating agents must also be also present in the invention. Nucleating agents suitable for this invention are generally of the sub class of nucleating agents known as clarifying agents that are commonly employed in polyolefins additive packages to promote rapid crystallization. Suitable materials include dibenzylidene sorbitol derivatives such as Millad 3988 and Millad NX8000 supplied by Milliken as well as Irgaclear D produced by BASF. Other suitable agents include aromatic amide systems such as NJ Star NU-100 provided by New Japan Chemical Company.

The nucleating agent is generally present in the adhesive compositions in amounts of about 0.05 to 5.0% by weight of the composition, preferably about 0.1 to 2.5% by weight are utilized, and most preferably about 0.2 to 1.0% by weight. Blends of two or more nucleating agent may also be used.

For example, a blend of a nucleating agent and a second nucleating agent that is different than the first nucleating agent may also be employed. From about 0.05% to about 5.0% by weight of one or more additional nucleating agent may be blended together with the first nucleating agent if desired. The nucleating agent may be used directly as a powder, as a slurry in a portion of suitable plasticizing agent, or as a component in a masterbatch of a suitable polymer such as Milliken NX-10.

A tackifying resin, as defined in the present description can be a molecule or a macro-molecule, generally a chemical compound or a fairly low molecular weight polymer, compared to common polymers, from a natural source or from a chemical process or combination thereof that in general enhances the adhesion of a final hot melt adhesive composition. Representative resins include the $C_5/C_9$ hydrocarbon resins, synthetic polyterpenes, rosin, rosin esters, natural terpenes, and the like. More particularly, the useful tackifying resins include any compatible resins or mixtures thereof such as (1) natural and modified rosins including gum rosin, wood rosin, tall oil rosin, distilled rosin, hydrogenated rosin, dimerized rosin, and polymerized rosin; (2)glycerol and pentaerythritol esters of natural and modified rosins, including the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; (3) copolymers and terpolymers of natural terpenes, such as styrene/terpene and alpha methyl styrene/terpene; (4)polyterpene resins generally resulting from the polymerization of terepene hydrocarbons, such as the bicyclic monoterpene known as pinene, in the presence of Friedel-Crafts catalysts at moderately low temperatures; also included are the hydrogenated polyterpene resins; (5) phenolic modified terpene resins and hydrogenated derivatives thereof such, for example, as the resin product resulting from the condensation, in an acidic medium, of a bicyclic terpene and a phenol; (6) aliphatic petroleum hydrocarbon resins resulting from the polymerization of monomers consisting primarily of olefins and diolefins; also included are the hydrogenated aliphatic petroleum hydrocarbon resins; and (7) cyclic petroleum hydrocarbon resins and the hydrogenated derivatives thereof. Mixtures of two or more of the above described tackifying resins may be required for some formulations. Also included are the cyclic or acylic C5 resins and aromatic modified acyclic or cyclic resins.

The tackifying resin should have a Ring and Ball softening point (measured by ASTM E28) of at least about 40° C., more preferably between about 80° C. and 140° C. and most preferably between about 85° C. and 135° F. A preferred tackifier possesses Ring and Ball softening point between about 85° C. to 140° C. and can be obtained from Exxon-Mobil Chemical under the tradenames of Escorez® 5400, 5415, 5600 and 5615. Other preferred tackifying resins are partially hydrogenated aliphatic hydrocarbon resins such as Eastotac® H100L and Eastotac® H100R, as well as non-hydrogenated aliphatic C5 resins and aromatic modified C5 resins with low aromaticity such as Piccotac® 1095 and Piccotac® 9095, respectively.

The tackifiers are generally present in the adhesive compositions in an amount greater than the amount of the polypropylene impact copolymer. Within this range, amounts of about 5 to 70% by weight of the composition, preferably about 10 to 60% by weight are utilized, and most preferably about 25 to 55% by weight. Blends of two or more tackifying resins may also be used. For example, a blend of a first tackifying resin and a second tackifying resin that is different than the first tackifying resin may also be employed. From about 5% to about 70% by weight of one or more additional tackifying resins may be blended together with the first tackifying resin if desired.

The plasticizer component useful in the present invention may be selected from any of the mineral based oils, petroleum based oils, liquid resins, liquid elastomers, polybutene, polyisobutylene, phthalate and benzoate plasticizers, and epoxidized soya oil. A plasticizer is broadly defined as a typically organic composition that can be added to the thermoplastic rubbers and other resins to improve extrudability, flexibility, workability and stretchability in the finished sealant. Any material which flows at ambient or application temperatures and is compatible in the compositions of the present invention may be useful. Preferably, the plasticizer has low volatility at temperatures of greater than about 40° C. The most commonly used plasticizers are oils which are primarily hydrocarbon oils, low in aromatic content and are paraffinic or naphthenic in character. The oils are preferably low in volatility, transparent and have as little color and odor as possible. This invention also may include olefin oligomers, low molecular weight polymers, vegetable oils and their derivatives and similar plasticizing oils. Solid plasticizers may also be useful to the present invention. Examples of such plasticizers include 1,4-cyclohexane dimethanol dibenzoate, glyceryl tribenzoate, pentaerythritol tetrabenzoate, and dicylcohexylphthalate. Preference is given to the petroleum based oils with suitable naphthenic minerals oils useful in this invention of the types herein described above are commercially available from Nynas, under the trade name Nyplast®. Suitable liquid plasticizers include polybutene such as Indopol® series materials supplied by Ineos. As required, blends of plasticizers can also be employed to adjust end use performance and final properties.

The adhesive composition contains from about 1% to about 60%, preferably about 5% to about 55%, more preferably about 10% to about 60%, by weight, of a plasticizer. Blends of two or more plasticizers may also be used. For example, a blend of a first plasticizer and a second plasticizer that is different than the first plasticizer may also be employed. From about 1% to about 60% by weight of one or more additional plasticizer may be blended together with the first plasticizer if desired.

The composition of the present invention may also contain from about 0 to 30% by weight, of a surfactant to make the adhesive more hydrophilic and to impart water permeability to the composition. The surfactants suitable for use herein comprise cationic, anionic or nonionic types. The more preferred surfactant is selected from a group of nonionic surfactants having HLB less than 15. These surfactants include alkyl amines and amides; alkanolamines and amides; amine oxides; ethoxylated fatty alcohols, ethoxylated fatty acids, ethoxylated alkylphenols, ethoxylated amines or amides; ethoxylated fatty esters and oils; glycerol fatty esters and their ethoxylated derivatives; sorbitan derivatives; sucrose and glucose esters and their derivatives. The most preferred surfactants will have a HLB between 3 and 12 and are selected from a subgroup including ethoxylated fatty alcohols, ethoxylated fatty acids, stearic acid, glycerol esters of fatty acids and their derivatives and sorbitan derivatives. Mixtures of two or more surfactants herein described above may be used for some formulations.

As used herein, the term "surfactant" or "surface-active agent" refers to any compound that reduces surface tension when dissolved in water or water solutions, or which reduces interfacial tension between two liquids, or between a liquid and a solid. Examples of suitable surfactants include, but are not limited to, the following:

1. Fatty acid esters such as glycerol esters, PEG esters, and sorbitan esters, including ethylene glycol distearate, ethylene glycol monostearate, glycerol mono and/or dioleate, PEG dioleate, PEG monolaurate, sorbitan monolaurate, sorbitan trioleate, etc. These surfactants are available from ICI, Rhone-Poulenc, and other sources.
2. Nonionic ethoxylates such as alkylphenol ethoxylates, alcohol thoxylates, alkylamine ethoxylates, etc., including octylphenol ethoxylate, nonylphenol ethoxylate, alkylamine ethoxylates, etc. These surfactants are available from Rhone-Poulene, Union Carbide, and other sources.
3. Nonionic surfactants such as 2,4,7,9-tetramethyl-5-decyn-4,7-diol available from Air Products.
4. Ethylene oxide/propylene oxide copolymers which are available from Union Carbide, BASF, etc. It should be noted that these and other surfactants can be blended if necessary to produce the best blend of hydrophilic performance properties.

Atmer® 129, a glycerol monostearate, manufactured by Uniquema Corporation, Atmer® 688, a nonionic surfactant blend manufactured by ICI Americas, Inc., and Aerosol® OT 100% surfactant (dioctyl sodium sulfosuccinate) made by Cytec Industries, Inc. have been found to be preferred surfactants for use in the present adhesive composition.

The present invention may include a stabilizer in an amount of from about 0% to about 5% by weight. Preferably from about 0.1% to 5% of a stabilizer is incorporated into the composition. The stabilizers which are useful in the hot melt wetness indicator adhesive compositions of the present invention are incorporated to help protect the polymers noted above, and thereby the total adhesive system, from the effects of thermal and oxidative degradation which normally occurs during the manufacture and application of the indicator as well as in the ordinary exposure of the final product to the ambient environment. Among the applicable stabilizers are high molecular weight hindered phenols and multifunction phenols, such as sulfur and phosphorous-containing phenols. Hindered phenols are well known to those skilled in the art and may be characterized as phenolic compounds that also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency and correspondingly, its reactivity; this steric hindrance thus providing the phenolic compound with its stabilizing properties. Representative hindered phenols include:

1,3,5-trimethyl-2,4,6-tris(3-5-di-tert-butyl-4-hydroxybenzyl)benzene;
pentaerythritol tetrakis-3(3,5-di-tert-butly-4-hydroxyphenyl)propionate;
n-octadecyl-3(3,5-di-tert-butyl-4-hydroxyphenyl) propionate;
4,4'-methylenebis(4-methyl-6-tertbutylphenol);
2,6-di-tert-butylphenol;
6-(4-hydroxyphenoxy)-2,4-bis(n-octylthio 1,3,5-triazine;
2,3,6-tris(4-hydroxy-3,5-di-tert-butyl-phenoxly,3,5-triazine
di-n-octadecyl-3,5-di-tert-butyl-4-ydroxybenzylphosphonate;
2-(n-octylthio)ethyl-3,5-di-tert-butyl-4-hydroxybenzoataen; and
sorbitol hexa-3(3,5-di-tet-butyl-4-hydroxy-phenyl)propionate.

Especially preferred as a stabilizer is pentaerythritol tetrakis-3(3,5-ditert-butyl-4-hydroxyphenol) propionate.

The performance of these stabilizers may be further enhanced by utilizing, in conjunction therewith; (1) synergists such as, for example, thiodipropionate esters and phosphites; and (2) chelating agents and metal deactivators such as, for example, ethylenediamenetetraacetic acid, salts thereof, and disalicylalpropylenediimine.

It should be understood that other optional additives may be incorporated into the adhesive composition of the present invention in order to modify particular physical properties. These may include, for example, such materials as ultraviolet light (UV) absorbers, surfactants, inert colorants, e.g., titanium dioxide, fluorescing agents and fillers. Typical fillers include talc, calcium carbonate, clay silica, mica, wollastonite, feldspar, aluminum silicate, alumina, hydrated alumina, glass microspheres, ceramic microspheres, thermoplastic microspheres, baryte and wood flour. In one particular embodiment, a wax selected from the group consisting of a paraffin wax, a microcrystalline wax, a polyethylene wax and a polypropylene wax may be added to the composition in amounts from 0% to about 5% by weight, preferably from about 0.1% to about 5% by weight, to adjust surface tack.

The hot melt adhesive composition of the present invention may be formulated using any of the techniques known in the art. A representative example of the mixing procedure involves placing all the components, except the copolymer, in a jacketed mixing vessel equipped with a rotor, and thereafter raising the temperature of the mixture to a range from 135 to 200° C. to melt the contents. It should be understood that the precise temperature to be used in this step would depend on the melting points of the particular ingredients. The copolymer is subsequently introduced to the vessel under agitation and the mixing is allowed to continue until a consistent and uniform mixture is formed. The contents of the vessel may be protected with inert gas such as carbon dioxide and/or nitrogen during the entire mixing process.

The resulting hot melt adhesive may then be applied to substrates using a variety of coating techniques. Examples include hot melt slot die coating, wheel coating, roll coating, melt-blown coating, extrusion and spiral spray coating.

The adhesive composition of the present invention may be used in a number of applications such as, for example, in disposable nonwoven hygienic articles, paper converting, flexible packaging, wood working, carton and case sealing, labeling and other assembly applications. Particularly preferred applications include a disposable diaper and feminine sanitary napkin construction, diaper and adult incontinent brief elastic attachment, diaper and napkin core stabilization, diaper backsheet lamination, industrial filter material conversion, surgical gown and surgical drape assemblies, a bandage, a tape, a label, a plastic sheet, a nonwoven sheet, a paper sheet, a cardboard, a book, a filter, or a package.

Tests and Materials

Brookfield viscosity was tested according to ASTM D-3236 Method at 163° C. (325° F.).

Ring & Ball softening point was determined with an automated Herzog unit according to ASTM E-28 method.

Dynamic Temperature Testing (ASTM D4440-01)

The rheology of a given hot melt adhesive can be determined using a TA Instruments rheometer, such as an Ares 3 model. For the adhesives listed in the tables below, a temperature step procedure was used to determine the storage modulus, G', at various temperatures as well as the glass transition temperature, Tg. The instrument was set to a frequency of 10 radians per second, the sample melted at 170° C. and the temperature reduced to −40° C. at 10° C. per minute. The parallel plates used had a 25 mm diameter and a 1.6 millimeter gap.

EXAMPLES

Raw Materials:

Nyflex 222B is a severely hydrotreated napthenic process oil available from Nynas Corporation.

Escorez 5615 is a hydrogenated aromatic modified cycloaliphatic hydrocarbon resin with a 130° C. softening point. It is available from ExxonMobil Chemical.

Escorez 5400 is a hydrogenated cycloaliphatic hydrocarbon resin with a 103° C. softening point. It is available from ExxonMobil Chemical.

Pro-fax RP591V is a random propylene copolymer available from Lyondellbasell Polymers. RP591V has a Melt Flow Rate (230° C./2.16 kg) of 100 g/10 min and a density of 0.90 g/cc.

Pro-fax EP501V is a propylene impact copolymer available from Lyondellbasell Polymers. EP501V has a Melt Flow Rate (230° C./2.16 kg) of 100 g/10 min and a density of 0.90 g/cc.

Vistamaxx 6202 is a metallocene catalyzed propylene based elastomer available from ExxonMobil Chemicals. It contains 85% propylene and 15% ethylene by weight. It has a Melt Index (190° C./2.16 kg) of 9.1 g/10 min and a density of 0.863 g/cc.

Dow Infuse 9807 Olefin Block Copolymer with a melt flow (190° C./2.16 kg) of 15 g/10 min and a density of 0.88 g/cc.

104N wax is a polyethylene wax with a Ring & Ball softening point of 118° C. and a density of 0.93 g/cc. It is available from Hana Corporation.

Dow Affinity GA 1900 is a polyolefin plastomer with a melt flow (190° C./2.16 kg) of ca. 1000 g/10 min and a density 0.87 g/cc. and Dow DNDB-1077 is a linear low density polyethylene with a melt flow (190° C./2.16 kg) of 100 g/10 min and a density of 0.93 g/cc.

LyondellBasell Petrothene GA 588189 is a linear low density polyethylene copolymer (butane comonomer) with a melt flow (190° C./2.16 kg) of 105 g/10 min and a density of 0.93 g/cc.

Dow Engage 8402 is an ethylene-octene polyolefin elastomer with melt flow (190° C./2.16 kg) 30 g/10 min and a density of 0.90 g/cc. It is available from Dow.

Irganox 1010 is pentaerythritol tetrakis(3-(3,5-di-tert-butyl-4-hydroxyphenyl)propionate) available from many different suppliers.

Irgafos 168 is tris(2,4-di-tert-butylphenyl)phosphate and is available from many different suppliers.

Millad NX8000 is a sorbitol based nucleating agent available from Milliken.

Procedure:

All formulations were produced on a 300 g scale, using the following method. A 475 mL steel vessel was charged with mineral oil, antioxidants, clarifying agent, tackifying resin, and, the low density polyethylene. Wax, if present, is also added at this point. A digitally-controlled heating mantel equipped with an internal thermocouple was used to gradually heat the formulation to the target temperature (177 to 190° C.). After the mixture appeared mostly homogenous, the solution was mechanically stirred between 100 to 200 rpm, and the low modulus polyolefin was gradually added followed by the polypropylene random copolymer. The resultant clear to slightly hazy molten mixture was held at the target temperature an additional 30 to 120 minutes until it appeared to be fully homogenized. After this time, the vessel was removed from the heating mantel and samples were collected for testing.

Example 1 and Comparative Examples 1 and 2

Table 1 describes the composition of inventive Example 1 as well as Comparative Examples 1 (CE1) and 2 (CE2).

TABLE 1

Example 1 Formulation and Comparitive Examples

| | Example 1 | CE1 | CE2 |
|---|---|---|---|
| Formulation | | | |
| Nyflex 222B, wt % | 30.0 | 30.0 | 30.0 |
| 104N Wax, wt % | — | 12.5 | — |
| Escorez 5400, wt % | 35.5 | 35.5 | 35.5 |
| Irgafos 168, wt % | 0.8 | 0.8 | 0.8 |
| Millad NX8000, wt % | 0.2 | 0.2 | — |
| Affinity GA 1900, wt % | 12.5 | — | 12.7 |
| Profax RP591V, wt % | 12.5 | 12.5 | 12.5 |
| Vistamaxx 6202, wt % | 8.5 | 8.5 | 8.5 |
| RBSP, ° C. | 143 | 140 | 130 |
| Viscosity at T= | | | |
| 135° C., cP | 19,600 | 11,950 | 18,800 |
| 149° C., cP | 11,925 | 6,850 | 11,570 |
| 163° C., cP | 7,563 | 4,462 | 7,425 |
| 177° C., cP | 5,125 | 3,112 | 5,100 |
| 191° C., cP | 3,890 | 2,375 | 3,270 |
| T-xover, ° C. | 115 | 115 | 72 |
| Tan δ, 75° C. | 0.2 | 1.6 | 1.5 |
| Tan δ, 50° C. | 0.2 | 1.1 | 0.2 |
| Tan δ, 25° C. | 0.2 | 0.1 | 0.3 |

Note:
Cross-over temperature (T-xover) and tan δ from dynamic mechanical analysis data collected on ARES rheometer cooling from 170 to −40° C. at 10 rad/s on 25 mm parallel plates.

While Example 1 and CE2 may display similar viscosities, significant differences can be seen in their thermal behavior. Specifically, Example 1 containing the NX8000 agent exhibits significantly improved set up as shown by the higher crossover temperature and tan δ trends seen in the DMA cooling trends in Table 1. Notable is the 115° C. crossover temperature of Example 1 compared to the value of 72° C. for CE2 that suggests far more rapid set up upon cooling. The solidification process seen for Example 1 is rapid and complete as temperatures are reduced below the crossover point as indicated by the low and consistent sub-unity tan δ values seen at 75, 50, and 25° C.) Comparative Example 1 (CE1 made with crystalline polyethylene wax in place of the low density polyethylene shows initial rapid set up based on the crossover point from the DMA cooling curve. As the temperature is dropped further, however, tan δ greater than unity are seen indicating residual fluidity and incomplete solidification of the wax-containing comparative example, CE2.

To illustrate the benefits of the unique combination of low density polyethylene in conjunction with nucleating agents to final performance, dog-bone test samples were prepared for the analysis of the adhesives bulk tensile properties.

Figure 2:
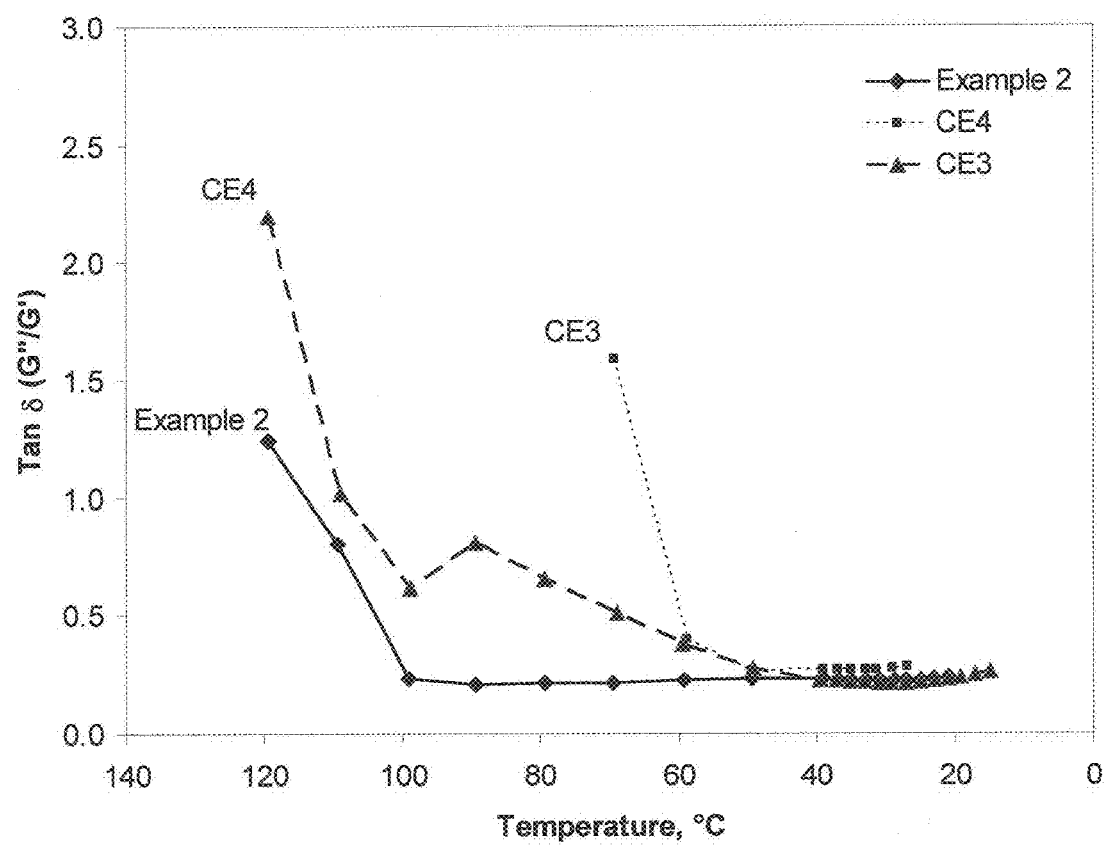
FIG. 2 is a graph of tan delta (G"/G') versus temperature for the compositions of inventive Example 2 and Comparative Examples 3 (CE3) and 4 (CE4) described hereinafter.

Stress-strain curves comparing formulation 1 to CE1, and CE2 are shown in FIG. 2 and data from these tests is summarized in Table 2. The data further illustrates the benefits of employing nucleation agents in combination with low density polyethylene species. While displaying high elongation, the sample containing only low-modulus polyolefin, CE2, yields readily. Conversely, the sample with wax and NX8000, CE1, while is considerably harder to deform, shows notably lower elongation. The response of Example 1 which is made using low density polyethylene in combination with nucleating agent shows greatly enhanced elongation relative to that prepared with wax which is perhaps not shocking given that low molecular weight, crystalline species provide little deformation resistance. Quite surprisingly, however, the Example 1 formulation also shows enhanced elongation values compared to the non-nucleated analogue, CE2. Thus, the Example 1 formulation displays a unique balance of rapid set up upon cooling yet showing enhanced physical properties desirable for functional hot melt adhesives.

TABLE 2

Mechanical Properties of Example 1 and Comparative Examples

| Example | $\sigma_y^a$ psi | $\varepsilon_y^b$ % | $\sigma_b^c$ psi | $\varepsilon_b^d$ % |
|---|---|---|---|---|
| 1 | 30 | 144 | 26 | 246 |
| CE1 | 67 | 32 | 47 | 154 |
| CE2 | 29 | 95 | 19 | 192 |

$^a\sigma_y$ = stress at yield;
$^b\varepsilon_y$ = strain at yield;
$^c\sigma_b$ = stress at break;
$^d\varepsilon_b$ = strain at break Example 2 and Comparative Examples 3 and 4

Table 3 lists formulations designed to highlight further the need for the inventive combination of nucleation agent and low density polyethylenes to improve the performance of adhesive formulations. Example 2 is prepared employing a NX8000 nucleating agent in combination with a low density polyethylene. Comparative Example 3 (CE3) is prepared using neither of the inventive components while Comparative Example 4 (CE4) is prepared solely with NX8000 and no low density polyethylene. Physical property data for the formulations is described are listed in Table 3 while FIG. 2 shows tan δ (G"/G') trends at a function of temperature for the samples.

TABLE 3

Formulation for Example 2 and Comparitive Examples 3 and 4

| Formulation | Example 2 | CE3 | CE4 |
|---|---|---|---|
| Nyflex 222B, wt % | 33.4 | 43.6 | 43.4 |
| Escorez 5400, wt % | 35.6 | 35.6 | 35.6 |
| Irganox 1010, wt % | 0.27 | 0.27 | 0.27 |
| Irgafos 168, wt % | 0.53 | 0.53 | 0.53 |
| Millad NX8000, wt % | 0.20 | 0.00 | 0.20 |
| Affinity GA 1900, wt % | 10.0 | 0.00 | 0.00 |
| Profax RP591V, wt % | 10.0 | 10.00 | 10.00 |
| Vistamaxx 6202, wt % | 10.0 | 10.00 | 10.00 |
| RBSP, ° C. | 134 | 122 | 139 |
| Viscosity at 149° C., cP | 9,212 | 4,687 | 5,162 |
| Viscosity at 163° C., cP | 5,950 | 2,990 | 3,095 |
| Viscosity at 177° C., cP | 3,825 | 2,065 | 2,195 |
| Viscosity at 191° C., cP | 3,085 | 1,470 | 1,522 |
| T-xover, ° C. | 115 | 67 | 109 |

TABLE 3-continued

Formulation for Example 2 and Comparitive Examples 3 and 4

| Formulation | Example 2 | CE3 | CE4 |
|---|---|---|---|
| Tan δ, 100° C. | 0.2 | 4.6 | 0.6 |
| Tan δ, 90° C. | 0.2 | 3.6 | 0.8 |
| Tan δ, 75° C. | 0.2 | 2.0 | 0.6 |
| Tan δ, 50° C. | 0.2 | 0.3 | 0.3 |
| Tan δ, 25° C. | 0.2 | 0.3 | 0.2 |

Perhaps as anticipated, CE3 which contains neither component of the invention displays a significantly lower crossover temperature in the DMA cooling curve relative to Example 2 or CE4. Despite this, tan δ (G"/G') values remain relatively unchanged once the material is cooled below the cross-over point suggesting material properties remain stable as the material is cooled to room temperature.

CE4 prepared with NX8000 only, shows a high crossover point relative to CE3. The tan δ values seen for CE4, however, trend steadily downward once the material is below the cross-over temperature of ca. 110° C. only reaching a minimum once the sample has reached ca. 25° C. The slow development of final properties seen in the DMA cooling curve for CE4 suggests that the nucleation effectiveness is significantly compromised. Clarifying agents such as NX8000 are known to induce rapid crystallization in bulk polypropylenes such as Pro-fax RP591V employed in the examples shown in Table 3. Without being bound to theory, the elevated cross-over point for CE4 suggests the NX8000 is capable of promoting gelation; despite this, the slow development of properties as indicated by the tan δ trend suggests CE4 retains some fluidity past its cross-over point only reaching its final state until much lower temperatures are achieved. Again, without being bound to theory, it is possible the relatively high levels of plasticizing agent utilized to keep the viscosity and overall performance suitable for a variety of coating methods and end-use applications retards solidification and delays development of the ultimate stiffness.

DMA cooling data for Example 2 prepared with the inventive combination of NX8000 agent and low density polyethylene displays a similarly high cross-over temperature as seen for CE4. Unlike CE4, however, the tan δ values seen collected on Example 2 a seen to drop to minimum once at temperature below the cross-over point; the tan δ values remain low for Example 2 as the sample is cooled to room temperature. Again, without being bound to theory, the DMA data suggests the use of NX8000 in tandem with a low density polyethylene leads to formulated adhesives that will develop properties more fully upon cooling. Such behavior greatly benefits a variety of end-uses where the rapid development of modulus after application is needed.

Example 3 and Comparative Example 5

Example 3 shows the utility of the invention in significantly plasticized, low viscosity formulations especially well suited for end-uses that require either low temperature application and/or low viscosity adhesives. Even in low viscosity formulations made by employing high amounts of plasticizing components, the inventive combination is shown to display high cross-over points and well as rapid set up as gauged by tan δ trends relative to Comparative Example 5 (CE5) which is generated without NX8000.

TABLE 4

Example 3 and CE5 Formulations and Characterization Data

| Formulation | Example 3 | CE5 |
|---|---|---|
| Nyflex 222B, wt % | 40.0 | 40.0 |
| Escorez 5400, wt % | 29.0 | 29.2 |
| Irgafos 168, wt % | 0.8 | 0.8 |
| Millad NX8000, wt % | 0.2 | — |
| Affinity GA 1900, wt % | 15.0 | 15.0 |
| Profax RP591V, wt % | 5.0 | 5.0 |
| Vistamaxx 6202, wt % | 10.0 | 10.0 |
| Ring & Ball Softening Point, ° C. | 138 | 122 |
| Viscosity at 149° C., cP | 4,687 | |
| at 163° C., cP | 2,990 | |
| at 177° C., cP | 2,065 | |
| at 191° C., cP | 1,470 | |
| T-xover, ° C. | 112 | 51 |
| Tan Delta, 100° C. | 0.3 | 4.6 |
| Tan Delta, 90° C. | 0.3 | 3.6 |
| Tan Delta, 75° C. | 0.3 | 2.0 |
| Tan Delta, 50° C. | 0.3 | 0.3 |
| Tan Delta, 25° C. | 0.3 | 0.3 |

The following are further illustrative Examples 4-14 of the inventive compositions with the amounts of ingredients listed in % by weight:

| | Example | | | | | | | | | | |
|---|---|---|---|---|---|---|---|---|---|---|---|
| | 4 | 5 | 6 | 7 | 8 | 9 | 10 | 11 | 12 | 13 | 14 |
| Nyflex 222B | 24.6 | 24.6 | 29.6 | 25.0 | 38.2 | 33.4 | 33.4 | 28.4 | 28.4 | 24.6 | 33.4 |
| 104N | 5.0 | — | — | — | — | — | — | — | — | — | — |
| Escorez 5400 | 44.4 | 44.4 | 44.4 | 49.0 | 35.6 | 35.6 | 35.6 | 35.6 | 35.6 | 44.4 | 35.6 |
| Millad NX8000 | 0.2 | 0.2 | 0.2 | 0.2 | 0.4 | 0.2 | 0.2 | 0.2 | 0.2 | 0.2 | 0.2 |
| Affinity GA 1900 | — | — | — | — | — | — | 10.0 | 10.0 | 12.5 | — | — |
| DNDB 1077 | — | — | — | 5.0 | 5.0 | 10.0 | — | — | — | — | — |
| Engage 8402 | — | 5.0 | 5.0 | — | — | — | — | — | — | — | — |
| GA 584189 | — | — | — | — | — | — | — | — | — | 5.0 | 10.0 |
| Profax RP591V | 12.5 | 12.5 | 10.0 | 10.0 | 10.0 | 10.0 | 10.0 | 12.5 | 11.3 | 12.5 | 10.0 |
| Vistamaxx 6202 | — | — | — | 10.0 | 10.0 | 10.0 | 10.0 | 12.5 | 11.3 | — | 10.0 |
| Infuse 9807 | 12.5 | 12.5 | 10.0 | — | — | — | — | — | — | 12.5 | — |
| RBSP, ° C. | 139 | 120 | 143 | 140 | 157 | 139 | 134 | 146 | 144 | 141 | 143 |
| Viscosity at T = | | | | | | | | | | | |
| 149° C., cP | 13,300 | — | 10,925 | 15,820 | 9,225 | 16,925 | 9,212 | 18,950 | 15,250 | 25,000 | 15,750 |
| 163° C., cP | 7,650 | 14,950 | 6,825 | 9,400 | 5,762 | 11,025 | 5,950 | 12,170 | 9,662 | 13,100 | 9,950 |
| 177° C., cP | 5,200 | 9,725 | 4,600 | 6,537 | 4,112 | 7,488 | 3,825 | 8,975 | 7,087 | 8,900 | 7,050 |
| 191° C., cP | 3,600 | 6,775 | 3,412 | 4,600 | 2,916 | 5,488 | 3,085 | 6,362 | 5,025 | 6,250 | 5,250 |
| T-xover, ° C. | | 110 | 109 | 109 | | | | 112 | 113 | | |
| Tan δ, 100° C. | | 0.22 | 0.21 | 0.26 | | | | 0.22 | 0.24 | | |
| Tan δ, 90° C. | | 0.25 | 0.22 | 0.21 | | | | 0.22 | 0.21 | | |
| Tan δ, 75° C. | | 0.22 | 0.22 | 0.21 | | | | 0.22 | 0.22 | | |
| Tan δ, 50° C. | | 0.15 | 0.15 | 0.19 | | | | 0.22 | 0.24 | | |
| Tan δ, 25° C. | | 0.18 | 0.15 | * | | | | 0.2 | 0.22 | | |

We claim:

1. A hot melt adhesive composition, comprising a blend of the following components:
   about 2% to about 20% of a polypropylene random copolymer having a melt flow rate of between about 10 and about 250 g/10 min according to ASTM D-1238 using a temperature of 230° C. and a 2.16 kg weight or mixtures thereof, wherein the comonomer is selected from the group consisting of ethylene and a 1-alkene;
   about 2.5% to about 20% by weight of an olefin based elastomer or a mixture of said olefin based elastomers, wherein the polypropylene random copolymer has a higher crystallinity than the olefin based elastomer;
   about 2.5% to about 20% by weight of a linear low density polyethylene or mixture of linear low density polyethylenes, wherein said linear low density polyethylene has a melt index value of from about 100 to about 1000 g/10 min (190° C./2.16 kg) and a density less than 0.94 g/cc as determined by the method described in ASTM D792-00;
   about 0.05 to about 5.0% by weight of a polyolefin nucleating agent comprising dibenzylidene sorbitol derivatives;
   about 10% to about 70% by weight of tackifying resin having a softening point of at least about 80° C. and up to about 140° C.;
   about 24.6% to about 60% by weight of a plasticizer;
   about 0.1% to about 5% of a stabilizer or antioxidant; and wherein the components total 100% by weight of the composition, the viscosity of the composition is equal to or less than about 20,000 cP at 163° C. and the tan-delta at 75° C. of the composition is from 0.2 to 0.3.

2. The hot melt adhesive composition of claim 1, comprising about 2.5% to about 15% by weight of said polypropylene random copolymer or said mixtures thereof.

3. The hot melt adhesive composition of claim 1, comprising about 5.0% to about 15% by weight of said olefin based elastomer or said mixture of said olefin based elastomers.

4. The hot melt adhesive composition of claim 1, comprising about 0.1% to about 2.5% by weight of said polyolefin nucleating agent.

5. The hot melt adhesive composition of claim 1, comprising about 0.2% to about 1.0% by weight of said polyolefin nucleating agent.

6. The hot melt adhesive composition of claim 1, comprising about 10% to about 60% by weight of said tackifying resin.

7. The hot melt adhesive composition of claim 1, comprising about 25% to about 50% by weight of said tackifying resin.

8. The hot melt adhesive composition of claim 1, wherein said tackifying resin has a softening point of from about 85° C. to about 135° C.

9. The hot melt adhesive composition of claim 1, comprising about 24.6% to about 55% by weight of said plasticizer.

10. The hot melt adhesive composition of claim 1, comprising about 24.6% to about 50% by weight of said plasticizer.

11. The hot melt adhesive composition of claim 1, wherein the components further comprise about 1% to about 15% by weight of an additional auxiliary polymer selected from the group consisting of EVA, APAO, PE, PP, PB, SIS, SI, SBS, SB, SIBS, SEB, SEBS, SEP, SEPS, SBBS, SEEPS and blends of each thereof, wherein the auxiliary polymer is a polymer different from said polypropylene random copolymer, said olefin based elastomer, said linear low density polyethylene, and said tackifying resin.

12. The hot melt adhesive composition of claim 1, wherein the components further comprise about 0.1% to about 5% by weight of a wax selected from the group consisting of a paraffin wax, a microcrystalline wax, a polyethylene wax, and a polypropylene wax.

13. A laminate comprising the adhesive composition of claim 1 used to make an end product selected from the group consisting of a disposable diaper, a sanitary napkin, a bed pad, a bandage, a surgical drape, a tape, a label, a plastic sheet, a nonwoven sheet, a paper sheet, a cardboard, a book, a filter, or a package.

14. The hot melt adhesive composition of claim 1, wherein the components further comprise additives, surfactants, fillers, or other auxiliary components.

15. The hot melt adhesive composition of claim 1, wherein said olefin based elastomer comprises a metallocene-catalyzed propylene based elastomer.

16. The hot melt adhesive composition of claim 1, wherein said plasticizer comprises polyisobutylene.

17. The hot melt adhesive composition of claim 15, wherein the metallocene-catalyzed propylene based elastomer comprises a copolymer of propylene and ethylene.

18. The hot melt adhesive composition of claim 1, wherein the composition does not contain ethylene-propylene rubbers.

19. A hot melt adhesive composition, comprising a blend of the following components:
 about 2% to about 20% of a polypropylene random copolymer having a melt flow rate of between about 10 and about 250 g/10 min according to ASTM D-1238 using a temperature of 230° C. and a 2.16 kg weight or mixtures thereof, wherein the comonomer is ethylene and the polypropylene random copolymer consists of a semi-crystalline phase comprising polypropylene homopolymer and rubbery phase comprising ethylene-propylene copolymer;
 about 2.5% to about 20% by weight of an olefin based elastomer or a mixture of said olefin based elastomers, wherein the polypropylene random copolymer has a higher crystallinity than the olefin based elastomer;
 about 2.5% to 20% by weight of a linear low density polyethylene or mixture of linear low density polyethylenes, wherein said linear low density polyethylene has a melt index value of from about 100 to about 1000 g/10 min (190° C./2.16 kg) and a density less than 0.94 g/cc as determined by the method described in ASTM D792-00;
 about 0.05 to about 5.0% by weight of a polyolefin nucleating agent comprising dibenzylidene sorbitol derivatives;
 about 10% to about 70% by weight of tackifying resin having a softening point of at least about 80° C. and up to about 140° C.;
 about 24.6% to about 60% by weight of a plasticizer;
 about 0.1% to about 5% of a stabilizer or antioxidant; and
 wherein the components total 100% by weight of the composition, the viscosity of the composition is equal to or less than about 20,000 cP at 163° C.

* * * * *